United States Patent
Salminen

[11] Patent Number: 5,827,360
[45] Date of Patent: Oct. 27, 1998

[54] METHOD AND EQUIPMENT FOR PRODUCING FOAM BITUMEN

[75] Inventor: Nestor Mikael Salminen, Turku, Finland

[73] Assignee: CMI Corporation, Oklahoma City, Okla.

[21] Appl. No.: 960,442

[22] Filed: Oct. 22, 1997

Related U.S. Application Data

[62] Division of Ser. No. 693,065, Oct. 9, 1996.

[51] Int. Cl.[6] ............................. C09D 195/00; B05B 7/24
[52] U.S. Cl. ....................... 106/273.1; 106/277; 239/142; 239/403; 239/417.5; 239/426
[58] Field of Search ................................. 106/273.1, 277, 106/122; 239/142, 403, 417.542, 426

[56] References Cited

U.S. PATENT DOCUMENTS

| | | |
|---|---|---|
| 2,917,395 | 12/1959 | Csanyi . |
| 4,592,507 | 6/1986 | Benedict . |
| 4,692,350 | 9/1987 | Clarke et al. . |
| 4,832,747 | 5/1989 | Marchal . |

FOREIGN PATENT DOCUMENTS

| | | |
|---|---|---|
| 0127933 | 12/1984 | European Pat. Off. . |
| WO8702694 | 5/1987 | WIPO . |

*Primary Examiner*—David Brunsman
*Attorney, Agent, or Firm*—Dunlap & Codding, P.C.

[57] ABSTRACT

The invention relates to a method and equipment for producing foam bitumen. Water is mixed to hot bitumen under a pressure which is lower than the prevailing absolute pressure, and after this the pressure is allowed to rise and the flow rate to drop. The mixing of water and bitumen occurs in a foaming reactor (17), which is connected via a pipeline (6, 8, 9, 10) to a spray bar (1), which also acts as a heat exchanger, and the changes in the flow caused by an inclination in the spray bar are compensated by means of pipes (6) and valves (7). The entire equipment is thermally insulated, and a part of it may be provided with electric heating to prevent the bitumen from solidifying. It is possible to circulate hot bitumen in the equipment by opening a valve (12), whereby the entire equipment is brought to an operating temperature.

8 Claims, 2 Drawing Sheets

METHOD AND EQUIPMENT FOR PRODUCING FOAM BITUMEN

This is a divisional of application Ser. No. 08/693,065 filed on Oct. 9, 1996.

The invention relates to a method for producing foam bitumen or the like by mixing liquid, such as water, and bitumen. The equipment according to the method can be used in mobile stabilizing machines or in fixed mixing plants. The equipment according to the invention comprises a foaming reactor, means for spreading foam bitumen and pipes related thereto, and valves required for adjustment.

The use of foam bitumen in asphalt work is prior art. Even though foam bitumen has been commonly used, the method has quite often caused difficulties and problematic situations in practice. The foaming principle in the earlier methods has been to add the foaming agent, in general water, to the substance to the foamed, generally bitumen, under pressure, whereupon the pressure is higher than the saturation pressure of steam at the temperature of a hot bituminous binder, and to let the mixture swell under a pressure lower than said saturation pressure of steam. Finnish Patent 872,911 discloses this type of method and equipment. The method according to this reference also employs an additional substance to improve the properties of the foam bitumen. Finnish Published Specification 57,807 also discloses a method for producing foam bitumen by using water and bitumen as starting materials. The solutions according to the patent are not, however, very well applicable to practice, and for example the static mixers of water and bitumen disclosed in the patent may clog easily, or they do not produce homogeneous foam bitumen.

The previous methods and equipments have usually ignored the effect of the foaming agent on the reaction temperature. The effect of the flow conduits and the spraying on the durability of the foam of the foamed substance has also been ignored. Therefore, the foamed bitumen and asphalt have not been homogenous, and problems have occurred in the use of the foaming equipments.

Tests and experiments have surprisingly revealed a matter which affects, in a cumulative and constant manner, the entire foaming procedure until the moment of spraying. A so-called reticulate structure is formed in the foaming equipment used in the foaming procedure in the beginning of the reaction. The reticulate structure is formed in such a way that at the foaming temperature of the hot bituminous binder under a high pressure, energy is transferred from the substance to be foamed to the foaming agent only in the surface layer. Naturally, the small amount of the foaming agent and the high pressure also have a negative effect on this, thus accelerating the formation of the reticulate structure. The reticulate structure simply consists of a net of molecules developing on the surface of the substance to be foamed according to natural laws, the molecule net trying to prevent other changes once it has itself become saturated. When the foamed hot bituminous binder bursts out of the equipment under a low pressure, the reticulate structure on the surface of the binder is broken, and if the equipment comprises one or two input lines, the reticulate bitumen which has lost its activity is immediately released in the area of the nozzles near the input line, and this shows in the finished processed material as a dark reticulate area. The dark stripes visible on the surface of the road thus result from a large amount of reticulate foam bitumen and inert bitumen being situated at these nozzle areas, and only inert bituminous binder being situated in the other nozzle areas. What is most problematic is that the faulty work performance cannot be detected by means of measurements of the bearing capacity, but in reality the result of the work is of lower quality than assumed. The material has become liable to reforming, and the bearing capacity of the base course has not improved.

If for example the temperature of the substance to be foamed is over 180° C., and foaming water is used over 10% of the substance to be foamed, or if the foaming agent is warmed to a temperature of e.g. 80° C. and is fed with a high pressure to the foaming equipment, very quick foaming and strong formation of steam may occur, whereupon the entire equipment may be destroyed in an explosion-like eruption. The situation may naturally cause a danger for those working near the asphalt machine. Therefore, known methods of producing foam bitumen have required infinitely accurate and careful work.

By means of the method and equipment according to the invention, the above-described drawbacks can be decidedly improved. The method and equipment for producing foam bitumen are characterized by what is disclosed in the appended claims.

The most important advantage of the method and equipment according to the invention is that they provide a more effective overall method for realizing the flow conduits and spraying of the foamed hot bituminous binder than what the methods and equipments known and used so far have provided. In the equipment according to the invention, hot bituminous binder circulates in the equipment during the entire working process, whereby the effectiveness of the equipment is maintained and the operating temperature does not fall under any circumstances. The devices following the foaming reactor are planned to be as simple as possible, and furthermore, they are insulated in order to decrease thermal problems. Elbows in the pipeline, contractions and possible cold surfaces have been eliminated to avoid the problems caused by clogging. If the hot bituminous binder has been reversed almost to its original state due to the complexity of the equipment, the bituminous binder is almost identical to the original bitumen and it bursts out of the nozzles in the form of a heavy liquid. By means of the method and equipment according to the invention, it is possible to produce asphalt of high quality both in a mobile system and in a fixed mixing plant, the equipment is easier to use, and safety at work is improved.

In the following, the invention will be described in greater detail with reference to the accompanying drawings.

BRIEF DESCRIPTION OF THE DRAWINGS

In FIG. 1, reference numeral 1 denotes a spray bar for foam bitumen. The spray bar 1 has two conduits, bitumen flowing in conduit 2 and foam bitumen flowing in conduit 3. The distribution of the foam bitumen is performed through control valves 4 via nozzles 5. The foam bitumen is supplied to the spray bar 1 via pipes 6, and the amount of the foam bitumen is adjusted by means of valves 7. A distribution manifold 8 distributes the foam bitumen to the pipes 6. The foam bitumen is supplied to the distribution manifold 8 by means of a pipe 9. The bitumen to be processed is supplied to a foaming reactor 17 via the conduit 2 of the spray bar 1 by means of a pipe 10. If the production of foam bitumen is not in progress, hot bitumen can be circulated from the conduit 3 of the spray bar 1 via a conduit 11 back to the bitumen tank, and the line is closed by means of a valve 12. The control valves 4 are controlled by means of a mechanical or electrical guide 13, which receives a control impulse from the valve control system 14. A system 15 controls the feeding of the foam bitumen to the spray bar 1 by adjusting the valves 7. Water is led to the foaming reactor 17 through a water inlet 16. FIG. 2 shows the foaming reactor 17, where reference numeral 18 denotes a water nozzle. Numeral 19 denotes an actuator, which moves a cone 21 situated at the end of a vector bar 20, the cone choking an orifice 23 at the end of a collar 22. The hot bitumen is led, via a pipe fitting 25, tangentially to a cylinder formed by a cylinder 24, whereby a whirling motion is created in the bitumen which presses into the inner part of the foaming reactor via the orifice 23 in the collar part 22 of the cylinder 24. A jet of water coming from the nozzle 18 is directed to a conical whirling jet of bitumen 27, where pressure has fallen due to the increasing flow rate. A mixer 28 consists of a round bar to which mixing blades 29 are attached. The purpose of these mixers 28 is to further homogenize and improve the foam bitumen. The foam bitumen leaves the foaming reactor 17 via an orifice 31 to a pipe fitting 30, which is placed tangentially in relation to the foaming reactor 17. The entire foaming reactor is insulated with an insulating material 32 to improve the energy efficiency. In the flow graph of FIG. 3, reference numeral 1 denotes the spray bar for foam bitumen, reference numeral 17 denotes the foaming reactors, and reference numeral 33 denotes the continuous asphalt mixer. Numeral 35 denotes the 3-way valves of the water and bitumen lines. Reference numeral 36 denotes the water outlet, and numeral 37 the water inlet. Correspondingly, reference numeral 38 denotes the bitumen inlet, and numeral 39 the bitumen outlet.

Figure 1:
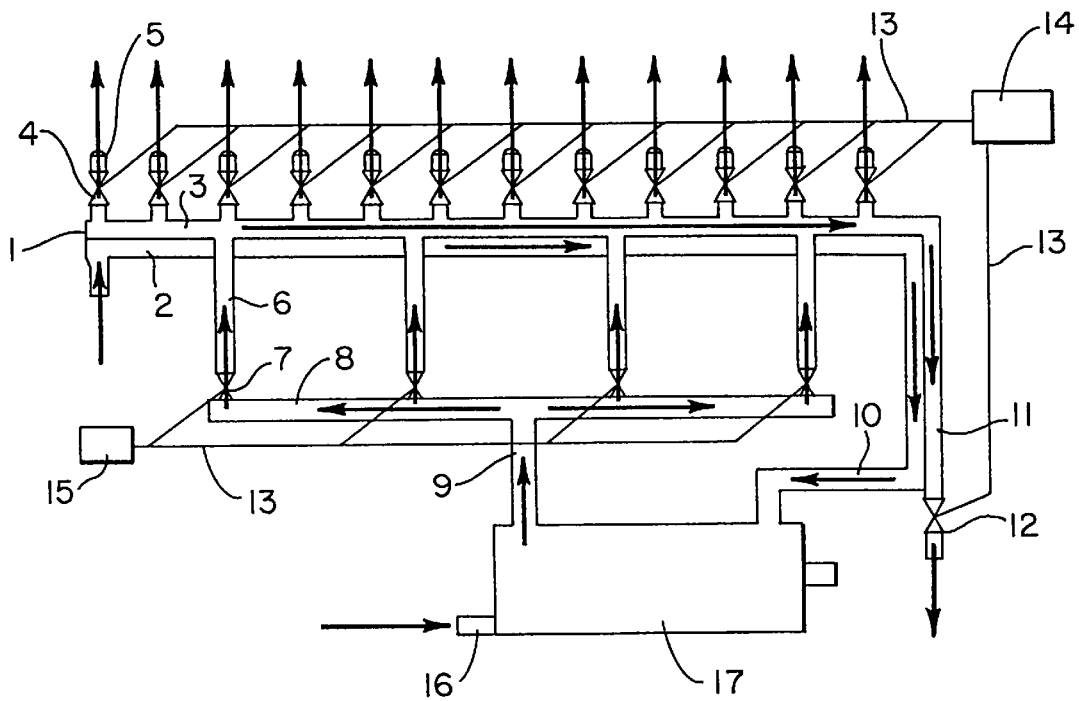
FIG. 1 shows schematically the method for producing foam bitumen.
Figure 2:
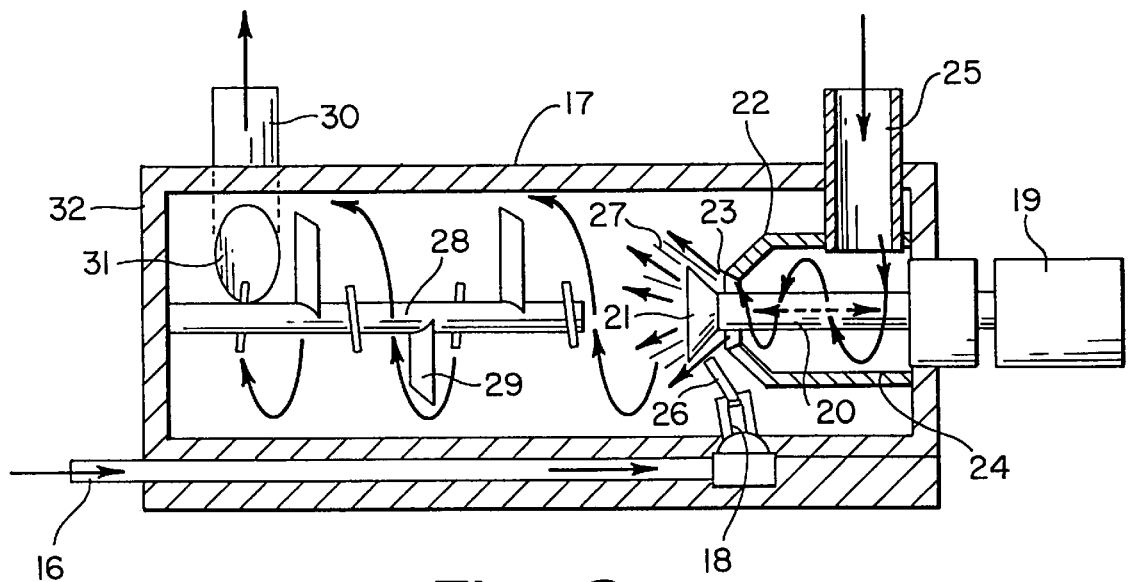
FIG. 2 shows schematically a longitudinal section of a foaming reactor.
Figure 3:
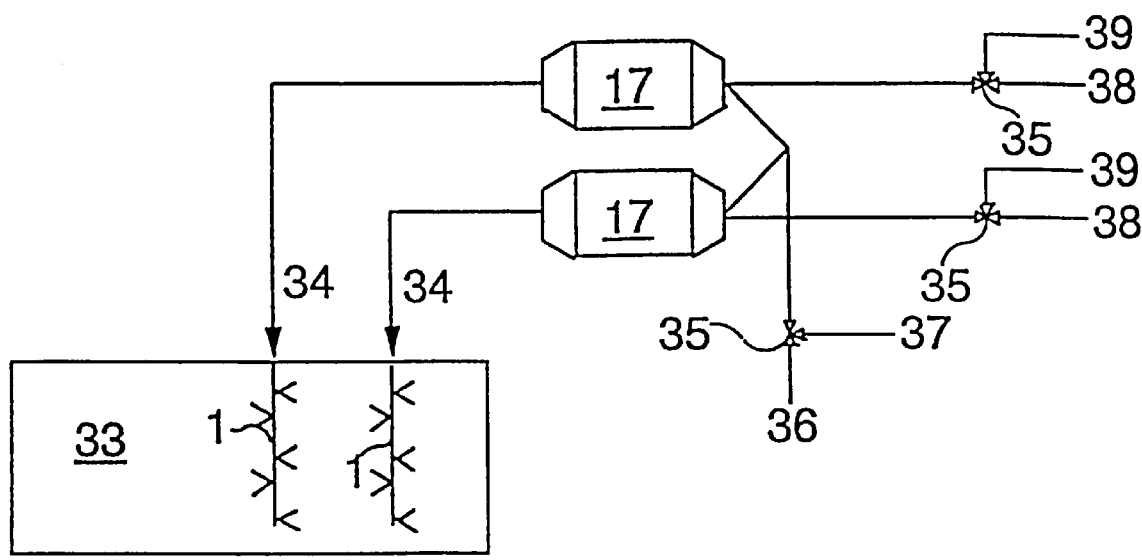
FIG. 3 shows a flow graph of a continuous mixing plant using foam bitumen.

The method and equipment according to the invention are used in the following way.

The heated bitumen is led from the bitumen tank to the spray bar 1 via the conduit 2, and from there via the pipe 10 of the conduit to the foaming reactor 17, from where the bitumen is taken via the pipe 9 to the distribution manifold 8, and from there via the pipes 6 to the spray bar 1 to the conduit 3, from where it is returned, via the conduit 11 at the end of the conduit, back to the bitumen tank to be heated. The circulation is continued until the temperature of the equipment is high enough. After this, the flow of the bitumen back to the feeding tank is closed with the valve 12, and the production of the foam bitumen is started by feeding water into the foaming reactor 17. The water is supplied to the foaming reactor 17 by means of the pipe 16, and the nozzle 18 forms a jet of water 26, which is fed into the jet of bitumen 27. The hot bitumen is supplied to the foaming reactor 17 through the pipe fitting 25 connected tangentially to the cylinder 24, so that a strong whirling motion can be created in the bitumen. The jet of bitumen bursts inside the foaming reactor via the orifice 23, which is adjusted by means of the cone 21 at the end of the vector bar 20, and the adjustment is performed by the action of the actuator 19. When the bitumen inside the cylinder 24 bursts from the orifice 23, it is choked to such an extent that the jet 27 creates a strong ejector effect inside the foaming reactor 17, and the pressure conditions in the jet 27 are essentially altered. The well-mixed foam bitumen is homogenized after this in the foaming reactor by means of the blades 29 of the static mixer 28, the blades improving the whirling motion of the foam bitumen. The foam bitumen is removed from the foaming reactor 17 through the orifice 31, which is connected to the pipe fitting 30. The removal of the bitumen occurs in the direction of the tangent. The resultant foam bitumen is supplied via the pipe 9 to the distribution manifold 8, where the valves 7 distribute the foam bitumen under pressure to the spray bar 1. The purpose of the valves 7, especially when mobile gear is used and the equipment is in an inclined position, is to distribute the amount or the pressurized foam bitumen in the right proportion to the spray bar 1. The control system 15 controls, via the actuators 13, the valves 7 in relation to the inclination of the asphalt machine. The valves 4 of the spray bar 1 are adjusted by means of the actuators 13 and the control system 14 in such a way, that the pipeline and the conduit 3 have an adequate pressure, so that no steam will be formed, and the actual foaming will take lace only after the nozzles 5. When the foaming is in progress, the control system 14 is used to close the valve 12 to stop the foam bitumen from entering the bitumen tank.

Since it is preferable in a fixed mixing plant to mix foam bitumen separately into coarse ballast and fine material, the mixing plant must be provided with two foaming reactors. The foaming reactor and the devices connected thereto operate during the entire procedure at an operating temperature, and the hot bituminous binder to be foamed is within the temperature range of 145° to 165° C. The foaming reactor operates in such a way that the hot bituminous binder needed for the foaming enters the reactor under the pressure of 4 bars, and during the reaction meets the foaming agent under the absolute pressure of 0.8 bars. Such a pressure is reached under the ejector effect, since the jet of bitumen 27 is made to flow at such a high rate as a result of the choking of the orifice 23 that the foaming pressure is lower than the atmospheric pressure. The pressure of the foamed binder at the end of the foaming reactor 17 and in the spraying devices connected to the reactor is about 3.5 bars, the fan-shaped jet bursting out of the spraying nozzles thus consisting of foamed substance, and no phenomenon of reticulate structure being visible.

In a mobile asphalt machine, the foaming reactor is adjusted according to the amount of the bitumen to be foamed, and the pressure and flow rate of the foaming agent, taking into consideration the width of the lane, the layer thickness of the material, the rate of the procedure, and the increase percentage of the foam bitumen. The information may be transferred either automatically or manually as a vector value to the foaming reactor, by means of which the size of the orifice 23 is controlled. In the foaming reactor, the same absolute pressure and flow rate always prevail at the moment of reaction, and the foaming occurs in such a way that no phenomenon of reticulate structure occurs, i.e. the resultant foamed product is one and the same homogenous substance, and the processed material always results in a product fulfilling the norms. The foaming reactor, which acts in a state according to the vector field diagram, always produces a completely foamed bituminous binder in the temperature range of 145° to 165° C. The foaming reactor can be used with a good result also in the lower temperature range of 125° to 145° C., but the operating efficacy within that temperature range is low, and the stabilizing rate is uneconomically low. To make the stabilization performed on the spot evenly homogenous despite the inclinations of the stabilizing lane, the equipment is provided with the above-described valves 7 of the valve system by means of which an entity regulating the flow of the foam bitumen either manually or automatically is achieved. When the equipment and method according to the invention are applied to hot asphalt machines, costs are reduced considerably. The extent of the reductions is illustrated for example by the fact that the investment costs can be amortized during the first year of operation.

The method and especially the equipment according to the invention for producing foam bitumen can naturally be realized in a different manner than in the embodiment according to the application. Thus, the flow graphs can be realized in a manner different from what is described in the application. The equipment constructions themselves may also differ from the arrangements according to the application. The foaming reactor and especially the mixer and the ejector contained in it may be realized in a different manner than what is described in the application. The distribution manifolds and the control valves may also be realized in a different way without deviating from the inventive idea according to the application.

I claim:

1. In an apparatus for producing foam bitumen from water and bitumen, the combination of:

a reactor having a first end and a second end; a bitumen inlet adjacent the first end thereof; a foam bitumen outlet adjacent the second end thereof, and a water inlet adjacent the first end thereof;

a cylinder in the first end portion of the reactor having one end closed at the first end of the reactor and an orifice in the opposite end thereof;

an adjustable cone partially restricting said orifice;

means for directing the bitumen from said bitumen inlet through said cylinder and out said orifice around said cone to form a conical jet of bitumen exiting said orifice; and a nozzle connected to said water inlet for directing a jet of water transversely into the jet of bitumen exiting said orifice, whereby the water is incorporated into the bitumen.

2. The combination defined in claim 1 wherein said reactor is generally cylindrical.

3. The combination defined in claim 2 characterized further to include:

a mixer in the reactor between said cone and said foam bitumen outlet.

4. The combination defined in claim 3 wherein said mixer moves the foam bitumen in a circular motion and said foam bitumen outlet extends tangentially from the reactor.

5. The combination defined in claim 1 characterized further to include insulation around the reactor.

6. The combination defined in claim 1 characterized further to include:

a vector bar attached to said cone and extending toward the first end of the reactor; and an actuator attached to said vector bar for moving said cone in and out of said orifice.

7. The combination defined in claim 1 characterized further to include means for directing the bitumen from the bitumen inlet in a circular motion around the interior of said cylinder.

8. The combination defined in claim 1 characterized further to include:

a foam bitumen distribution system, including a spray bar and a plurality of spray nozzles connected to the spray bar, connected to said foam bitumen outlet; whereby foaming of the foam bitumen takes place upon discharge from said spray nozzles.

* * * * *